April 6, 1965  A. R. CUNNINGHAM  3,176,631
PELLETING MACHINE HAVING GROOVED PELLET HOLES
Filed Jan. 21, 1963  2 Sheets-Sheet 1
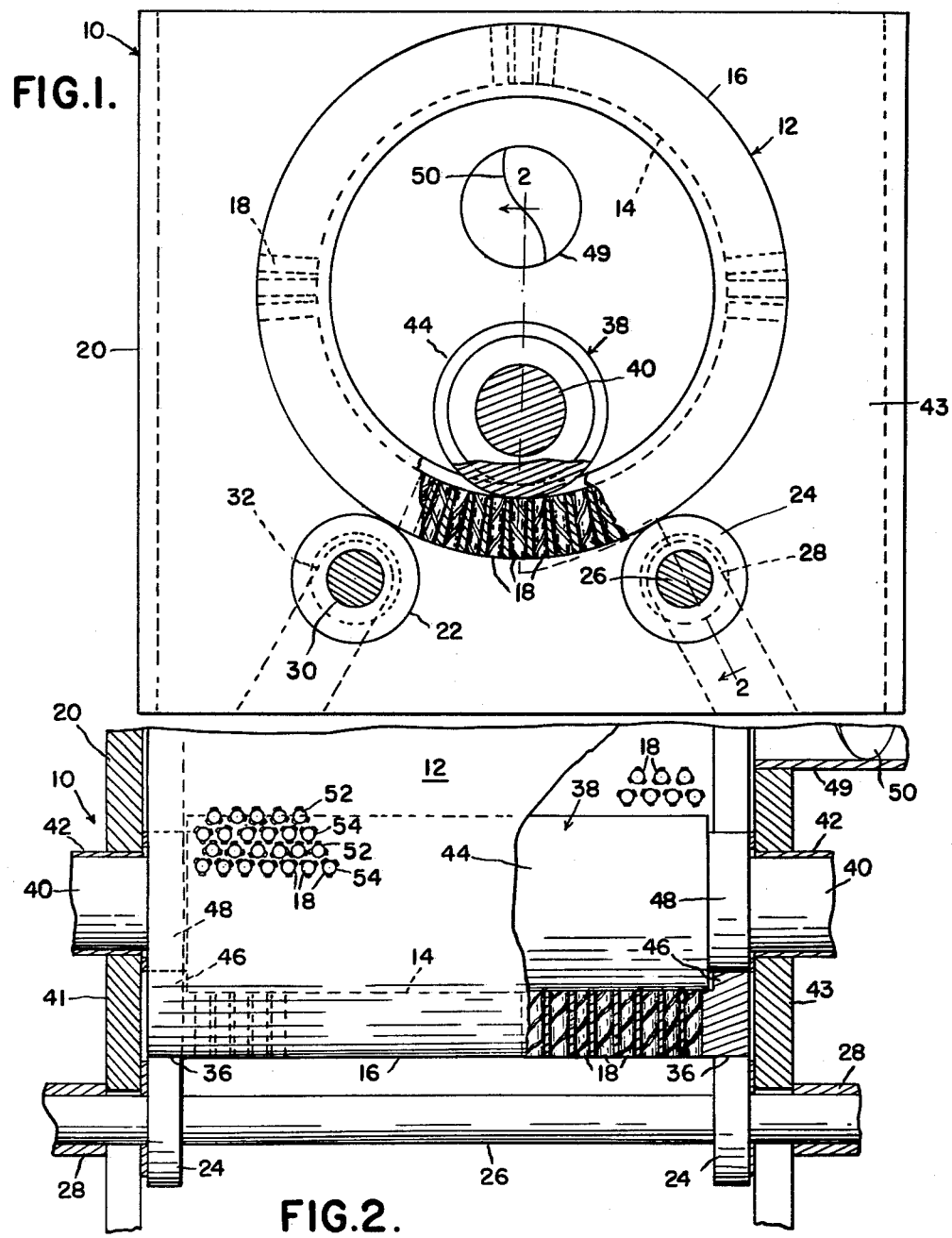
INVENTOR.
ARTHUR RAYMOND CUNNINGHAM
BY
Whittemore, Hulbert & Belknap
ATTORNEYS April 6, 1965  A. R. CUNNINGHAM  3,176,631
PELLETING MACHINE HAVING GROOVED PELLET HOLES
Filed Jan. 21, 1963  2 Sheets-Sheet 2
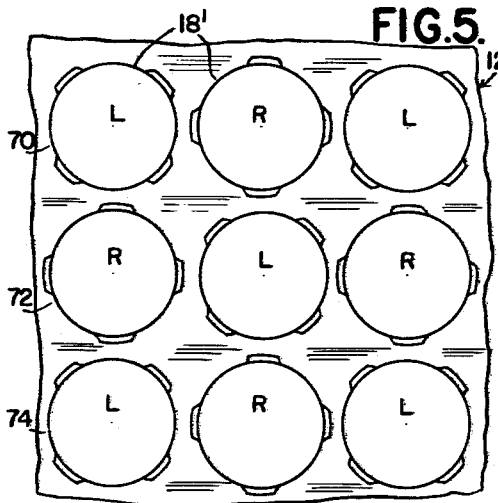
FIG.5.
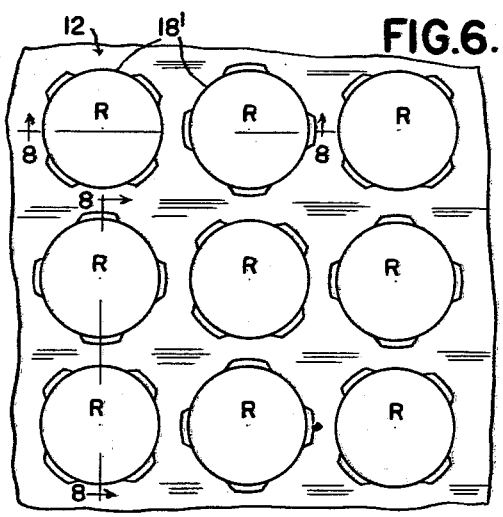
FIG.6.
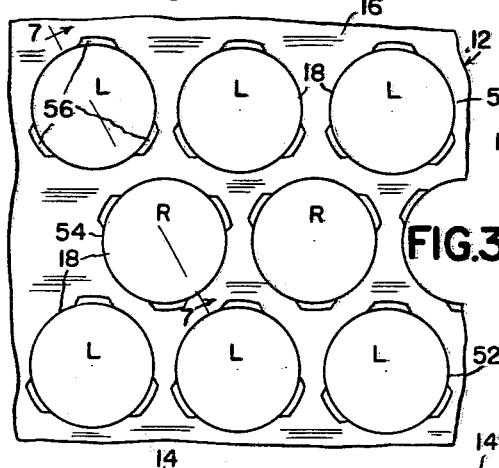
FIG.3.
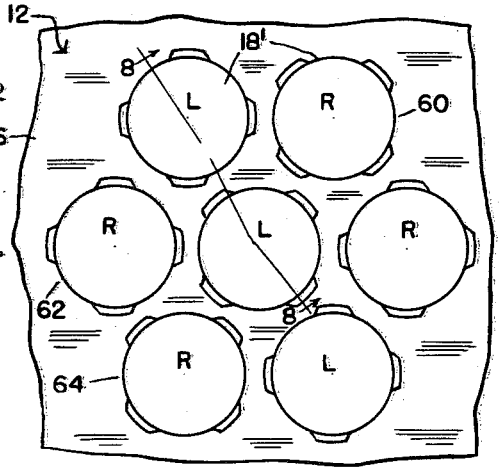
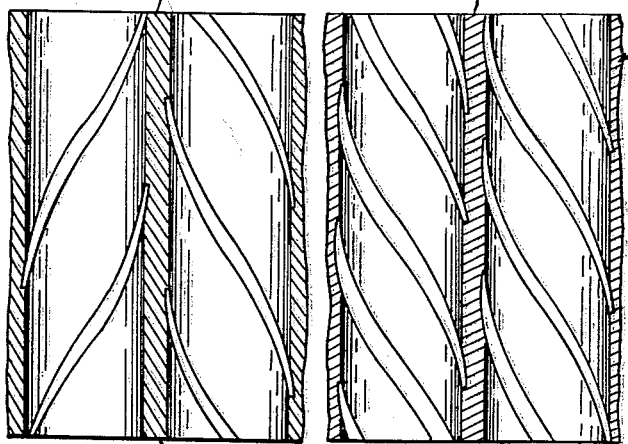
FIG.7.  FIG.8.
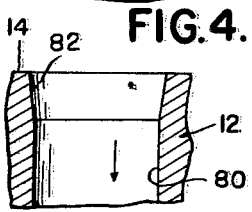
FIG.4.
FIG.9.
INVENTOR.
ARTHUR RAYMOND CUNNINGHAM
BY
Whittemore, Hulbert & Belknap
ATTORNEYS

United States Patent Office 3,176,631
Patented Apr. 6, 1965

3,176,631
PELLETING MACHINE HAVING GROOVED PELLET HOLES
Arthur Raymond Cunningham, Chicago, Ill., assignor to Cunningham & Sons, Chicago, Ill., a partnership
Filed Jan. 21, 1963, Ser. No. 252,717
15 Claims. (Cl. 107—14)

This invention relates generally to a machine for compressing and pelleting a cut crop, and refers more particularly to a machine having compressing and pelleting holes or passages through which the crop is forced under pressure.

An essential object of the invention is to provide a machine for compressing and pelleting a cut crop having pellet holes or passages so constructed as to resist movement of the crop therethrough, thereby producing denser pellets.

Another object is to provide a machine in which the pellet holes have generally circumferentially extending grooves for resisting movement of the crop.

Another object is to provide a pelleting machine wherein the grooves are so constructed as to be self-cleaning.

Another object is to provide a pelleting machine wherein the grooves are helical or annular.

Another object is to provide a pelleting machine in which the grooves of adjacent holes are so arranged that the holes can be very close together without weakening the separating web of material.

Another object is to provide a pelleting machine wherein the holes are arranged in closely spaced parallel relationship to one another, each hole has a helical groove, and the convolutions of the groove of any one hole pass through the web of material separating that hole from an adjacent hole at points spaced axially from the points where the convolutions of the groove of the adjacent hole pass through the separating web of material.

Other objects and features of the invention will become apparent as the description proceeds, especially when taken in conjunction with the accompanying drawings, wherein:

FIGURE 1 is an elevational view, with parts broken away and in section, of a pelleting machine embodying my invention. The front wall of the machine housing has been removed in this figure.

FIGURE 2 is a fragmentary elevational view of the pelleting machine, with parts broken away and in section, the parts in section being taken substantially on the line 2—2 of FIGURE 1.

FIGURE 3 is an enlarged fragmentary elevation of a portion of FIGURE 2.

FIGURES 4, 5 and 6 are like FIGURE 3 but show modifications.

FIGURE 7 is a sectional view taken on the line 7—7 of FIGURE 3.

FIGURE 8 is a sectional view taken on the lines 8—8 in FIGURES 4 and 6.

FIGURE 9 is a sectional view showing a further modification.

Referring now more particularly to the drawings and especially to FIGURES 1-3 and 7 thereof, the machine is generally indicated at 10, and includes a pelleting ring or drum 12 formed with concentric radially inner and outer surfaces 14 and 16. The ring has holes 18 extending radially therethrough from the inner to the outer surface thereof. The holes are arranged in circumferentially spaced rows with the holes in each row spaced axially from each other.

The ring 12 is supported for rotation within the housing 20 by backup rolls 22 and 24. A pair of the backup rolls 24 are mounted on the shaft 26 near the ends thereof in axially spaced relation. The shaft 26 is supported in fixed position with its axis parallel to the axis of the pelleting ring 12 by the bearing structure generally indicated at 28. A pair of backup rolls 22 are mounted on a shaft 30 near the ends thereof in axially spaced relation. The shaft 30 is parallel to the axis of the pelleting ring 12 and is supported at the ends by the bearing structure generally designated 32. The pairs of backup rolls 22 and the pairs of backup rolls 24 are spaced apart axially far enough to span the apertured outer surface 16 of the pelleting ring and to engage the unapertured lateral extensions 36 of the outer surface 16 of the ring.

Extending within the pelleting ring 12 on an axis parallel thereto is a pressure roll 38 provided with spindles 40 journalled in bearings 42 in the front and rear walls 41 and 43 of the housing 20. The pressure roll has an enlarged central cylindrical portion 44 of a width corresponding to that of the apertured portion of the pelleting ring. The pelleting ring 12 has inwardly projecting annular rims 46 on opposite sides of the cylindrical inner apertured surface 14. The enlarged central portion 44 of the pressure roll fits between these rims. There is a clearance between the cylindrical surface of the enlarged central portion 44 of the pressure roll and the opposed apertured inner surface of the ring. The cylindrical portions 48 of the pressure roll on opposite sides of the enlarged central portion 44 closely approaches, although preferably they do not contact, the rims 46.

Suitable means are provided to drive the pressure roll 38 and the pelleting ring 12. Preferably, the pressure roll is rotated at a rate such that the peripheral speed of the surface of its central portion 44 exceeds the peripheral speed of the radially inner apertured surface 14 of the ring, although the difference in peripheral speeds is not great. Hence there is a rubbing or chafing action on the crop material between these surfaces as it is pressed radially outward through the apertures 18.

The crop material is fed into the ring 12 through the rear wall 43 of the housing 20 by a tube 49. A screw 50 may be provided to advance the crop material through the tube. The crop material drops to the bottom of the ring and is pressed outward through the holes in the bottom section of the ring by the pressure roll, as the pressure roll and ring rotate. Any suitable means may be provided to break off the pellets as they extrude from holes 18 and in the present instance the pellets may be broken off by contact with the shafts 26 and 30 of the backup rolls.

The pellet holes 18 are grooved to provide resistance to the movement of the crop material and therefore to produce denser pellets. Referring to FIGURE 3, the holes 18 will be seen to be arranged in axially extending, circumferentially spaced rows. Alternate rows are designated 52 and the remaining rows are designated 54. The holes in the rows 52, including the grooves thereof, are identical. Each hole in the rows 52 has three helical grooves 56 spaced 120° apart, and each of the grooves is identical, that is they are of the same cross-section and helix angle. The grooves extend from one end of the holes to the other. The grooves in the rows 52 of holes are all of the same hand, in the present instance left hand and are designated L. Moreover, the grooves of the holes in rows 52 are in phase with one another, that is they are in the same angular relationship. Hence the grooves of the various holes in the alternate rows appear in the same angular positions in FIGURE 3, which is a view of the holes at the outer surface of the pelleting ring 12. The same would be true at the inner surface or any intermediate section, that is the grooves of any one of these holes would appear in the same angular positions as the grooves of any of the other of these holes, although perhaps rotated from the FIGURE 3 position.

The arrangement of grooves of the holes in the rows 52 is such that the grooves of any one of these holes passes through the web of material separating that hole from the adjacent hole in the same row at points spaced axially from the points where the grooves of the adjacent hole pass through the separating web. Referring to FIGURE 3, it will be apparent that the groove of the upper left hand hole in the four o'clock position will pass through the web of material separating that hole from the middle hole in the same row at a point spaced axially from the point where the groove of the middle hole in the twelve o'clock position passes through the separating web of material. These grooves are in effect rotating in the same direction.

The holes in the remaining rows 54, including the grooves thereof, are exactly like the holes in the rows 52 with two exceptions. First of all, the holes in rows 54 have helical grooves which are right hand in direction as indicated by the letter R, and secondly, the grooves thereof are 60° out of phase with respect to the grooves in rows 52. The holes in rows 54, including their grooves, are identical with one another. The grooves are the same in cross-section and helix angle, extend from one end of the holes to the other, and are of the same hand. The grooves of the holes in rows 54 are also in phase with one another, and as indicated above, by that is meant any transverse section through these holes will present the grooves in the same angular relationship. For example, at the outer surface of the ring the grooves are in the two o'clock, six o'clock and ten o'clock positions.

Since the grooves of the holes in rows 54 are of the same hand and in phase with one another, the grooves of adjacent holes will pass through the separating web of material in the pelleting ring at axially spaced points, as was true of the grooves of adjacent holes in rows 52.

The reason for this arrangement of grooves of adjacent holes, is to avoid having the grooves of adjacent holes pass through the separating web of material at the same point. As a result, it is possible to place the holes close together without unduly reducing the web thickness at any point between adjacent holes.

The holes in rows 54 are staggered with respect to the holes in rows 52.

FIGURE 7 shows how the grooves of the adjacent holes in rows 52 and 54 pass through the separating web of material. Thus the grooves of the holes in rows 52 pass through the web separating them from adjacent holes in rows 54 at points spaced axially from the points where the grooves of the adjacent holes in rows 54 pass through the separating webs.

The ring 12 will have alternately rows 52 and 54 of grooves all the way around.

FIGURE 4 illustrates a modified arrangement of holes. The holes in FIGURE 4 are designated 18' because they have four grooves each, instead of three. Certain of the holes in FIGURE 4 have left hand grooves, designated L, and the remaining holes have right hand grooves and are designated R. The holes with left hand grooves are identical except that the grooves of certain of these are 45° out of phase with the grooves of the others. The grooves of each left hand hole are spaced 90° apart and are identical in cross-section and helix angle, extending from one end of the hole to the other.

The right hand holes are identical with one another except that the grooves of some of these holes are 90° out of phase with the grooves of the other holes. However, the grooves of each right hand hole are 90° apart, are of the same cross-section and helix angle, and extend from one end of the hole to the other.

As seen in FIGURE 4, each of the axial rows 60, 62 and 64 has alternately right and left hand holes, and the adjacent holes in each row are 45° out of phase with one another. The holes in alternate rows are staggered with respect to the holes in the remaining rows. The holes of adjacent rows which are adjacent to one another and of the same hand are also 45° out of phase. The pattern shown in FIGURE 4 will be repeated all the way around ring 12.

FIGURE 8 illustrates the groove arrangement whereby the grooves of adjacent holes 18' pass through the separating web of material at axially spaced points.

FIGURE 5 shows a modification of the FIGURE 4 arrangement, in which the holes in the axial rows 70, 72 and 74 are not staggered with respect to one another. The holes are here again designated 18' because they are like the holes described in FIGURE 4. The holes in the rows 70, 72 and 74 are alternately left and right hand and the grooves of each hole are 45° out of phase with the grooves of the adjacent hole in the same row. Considering the relationship between the holes in vertical rows, that is circumferentially of the ring, the holes are alternately right and left hand and each hole is 45° out of phase with respect to the adjacent hole in the same row. The arrangement of holes is such that adjacent holes in the vertical or horizontal rows can be spaced closely together because the grooves thereof intersect the separating web at axially spaced points. While the grooves of the upper left hand hole shown in FIGURE 5 and the middle hole intersect the separating web of material at the same axially spaced points, this is of no importance because, due to the non-staggered relationship, the separating web is sufficiently thick that it will not be weakened by this groove relationship.

FIGURE 6 shows a modification of the FIGURE 5 hole arrangement. The only difference is that in FIGURE 6 all of the holes are of the same hand, in this instance right hand. They might equally well be left hand.

FIGURE 9 shows a modified hole construction. The hole 80 there illustrated is cylindrical throughout most of its length, that is from the inner to the outer surface of the pelleting ring. At the inner surface it is flared somewhat as indicated at 82, to facilitate the introduction of crop material. Near its outer end, the hole has an annular groove 84. The groove has two annular sides 86 and 88, the side 88 forming a smaller angle with the wall of the groove than the side 86 so that the hole will be substantially self-cleaning upon movement of the crop material therethrough in the direction of the arrow. It will be understood that the ring 12 may have a multiplicity of holes like hole 80 in place of the holes 18 in FIGURE 2. The groove 84 will serve to retard the movement of the crop material to produce denser pellets.

When the pelleting ring 12 is provided with a large number of closely spaced holes of the type shown in FIGURE 9, the annular grooves of adjacent holes should be in different axial positions. This will enable placing the holes closer together without unduly weakening the separating web of material.

Referring back to the helical groove arrangements shown in FIGURES 3–6, it will be understood that in each instance the convolutions of the grooves of any one hole pass through the web of material separating that hole from an adjacent hole at points spaced axially from the points where the convolutions of the grooves of the adjacent hole pass through the separating web. The only exception to this is in FIGURES 5 and 6 where the diagonally adjacent holes are, by virtue of the non-staggered relationship, far enough apart that the positions of the grooves do not matter.

By making it possible to place the grooved pellet holes closer together more holes can be provided in a given space. Accordingly, the machine capacity is increased.

What I claim as my invention is:

1. In a machine for compressing and pelleting a cut crop, a member having a plurality of holes arranged in closely spaced parallel relation to one another and through which the cut crop is adapted to be pressed to compress the same into pellets, said holes extending entirely through said member from one side thereof to the other and being of substantial length, said holes each having a helical groove therein to retard the movement of the crop through said holes and thereby increase the compression thereof, the convolutions of the groove of any one hole passing through the web of material separating said one hole from an adjacent hole at points spaced axially from the points where the convolutions of the groove of said adjacent hole pass through said separating web of material.

2. The structure defined in claim 1, wherein the grooves of adjacent holes are angularly out of phase with one another.

3. The structure defined in claim 2, wherein the grooves of adjacent holes are of opposite hand and angularly out of phase with one another, said out of phase relationship being less than $$\frac{360°}{\text{number of grooves per hole}}$$

4. The structure defined in claim 3, wherein said out of phase relationship is equal to $$\frac{360°}{\text{number of grooves per hole} \times 2}$$

5. In a machine for compressing and pelleting a cut crop, a member having a plurality of holes arranged in closely spaced parallel relation to one another and through which the cut crop is adapted to be pressed to compress the same into pellets, said holes extending entirely through said member from one side thereof to the other and being of substantial length, each hole having the same number of helical grooves therein to retard the movement of the crop through said holes and thereby increase the compression thereof, said grooves of each hole being angularly spaced from one another so that the convolutions thereof are spaced apart axially, the convolutions of the grooves of any one hole passing through the web of material separating said one hole from an adjacent hole at points spaced axially from the points where the convolutions of the grooves of said adjacent hole pass through said separating web of material.

6. The structure defined in claim 5, wherein said holes are arranged in parallel rows, the grooves in the holes of alternate rows being of the same hand and the grooves of the remaining rows being of the opposite hand.

7. The structure defined in claim 6, wherein the grooves in the holes of the alternate rows are angularly in phase with one another but out of phase with the grooves in the holes in the remaining rows, and the holes in the alternate rows are staggered with respect to the holes in the remaining rows.

8. The structure defined in claim 5, wherein said holes are arranged in parallel rows, the grooves of the holes in each row being alternately of one hand and the other.

9. The structure defined in claim 8, wherein the grooves in each hole are angularly out of phase with the grooves in every hole next adjacent thereto.

10. The structure defined in claim 5, wherein the grooves of all of said holes are of the same hand.

11. The structure defined in claim 5, wherein said holes are arranged in parallel rows, the holes in each row being respectively aligned with the holes in the other rows and such alignment of holes in the different rows being at right angles to said parallel rows of holes, the grooves of the holes in each row being alternately of one hand and the other, and the holes in alignment with each other being alternately of one hand and the other.

12. In a machine for compressing and pelleting a cut crop, a member having a plurality of holes through which the cut crop is adapted to be pressed to compress the same into pellets, said holes extending entirely through said member from one side thereof to the other and being of substantial length, said holes each having a generally circumferentialy extending helical groove therein to retard the movement of the crop through said holes and thereby increase the compression thereof.

13. In a machine for compressing and pelleting a cut crop, a member having a plurality of holes arranged in closely spaced parallel relation to one another and through which the cut crop is adapted to be pressed to compress the same into pellets, said holes extending entirely through said member from one side thereof to the other and being of substantial length, said holes each having circumferentially extending axially spaced groove portions therein to retard the movement of the crop through said holes and thereby increase the compression thereof, adjacent holes being separated from one another by a web of material of said member, the axially spaced groove portions of one of said adjacent holes passing through said web of material at points spaced axially from the points where the axially spaced groove portions of the other of said adjacent holes pass through said separating web of material.

14. The structure defined in claim 13, wherein the groove portions in each hole are portions of a helical groove.

15. In a machine for compressing and pelleting a cut crop, a member having closely spaced holes through which the cut crop is adapted to be pressed to compress the same into pellets, said holes extending entirely through said member from one side thereof to the other and being of substantial length, said holes each having a groove therein to retard the movement of the crop through said holes and thereby increase the compression thereof, said holes being separated from one another by a web of material of said member, the groove of one of said holes having a circumferentially extending portion passing through said web of material, the groove of the other of said holes having a circumferentially extending portion passing through said web of material at a point spaced axially from the point where the circumferentially extending portion of the said one hole passes through said separating web of material.

References Cited by the Examiner

UNITED STATES PATENTS 2,059,486 11/36 Payne et al. _____ 107—8.35
2,902,715 9/59 Norman _____ 107—14

FOREIGN PATENTS 602,126 7/60 Canada.
790,236 2/58 Great Britain.

WALTER A. SCHEEL, *Primary Examiner.*